(12) United States Patent
Egger et al.

(10) Patent No.: US 12,365,159 B2
(45) Date of Patent: Jul. 22, 2025

(54) METHOD AND DEVICE FOR MEASURING THE FILTRATE CONTENT ON A SCREW PRESS

(71) Applicant: ANDRITZ AG, Graz (AT)

(72) Inventors: Markus Egger, Graz (AT); Franco Pichler, Voitsberg (AT); Daniel Stelzer, Veitsch (AT); Stefan Willberger, Eggersdorf bei Graz (AT)

(73) Assignee: ANDRITZ AG, Graz (AT)

( * ) Notice: Subject to any disclaimer, the term of this patent is extended or adjusted under 35 U.S.C. 154(b) by 168 days.

(21) Appl. No.: 18/005,684

(22) PCT Filed: Jun. 2, 2021

(86) PCT No.: PCT/EP2021/064778
§ 371 (c)(1),
(2) Date: Jan. 17, 2023

(87) PCT Pub. No.: WO2022/017672
PCT Pub. Date: Jan. 27, 2022

(65) Prior Publication Data
US 2024/0239073 A1    Jul. 18, 2024

(30) Foreign Application Priority Data
Jul. 21, 2020 (AT) .............................. A 50627/2020

(51) Int. Cl.
*B30B 9/16* (2006.01)
*B30B 9/12* (2006.01)

(52) U.S. Cl.
CPC ............... *B30B 9/125* (2013.01); *B30B 9/16* (2013.01)

(58) Field of Classification Search
CPC .............. B30B 9/12; B30B 9/125; B30B 9/14
See application file for complete search history.

(56) References Cited

U.S. PATENT DOCUMENTS

| | | | |
|---|---|---|---|
| 6,792,850 B2 * | 9/2004 | Scheucher | B30B 9/12 100/145 |
| 7,906,029 B2 | 3/2011 | Sugaya et al. | |
| 10,745,310 B2 * | 8/2020 | Hunt | B01D 33/466 |
| 2021/0039893 A1 * | 2/2021 | Pettersson | B30B 9/3096 |

FOREIGN PATENT DOCUMENTS

| | | |
|---|---|---|
| DE | 202012008077 U1 | 9/2012 |
| DE | 202017105625 U1 | 9/2017 |
| DE | 102017115080 A1 | 1/2019 |
| JP | 5832599 A | 2/1983 |
| JP | 2001030096 A | 2/2001 |

OTHER PUBLICATIONS

International Preliminary Report on Patentability dated Jun. 23, 2022 for International Patent Application No. PCT/EP2021/064778. International Search Report mailed Sep. 9, 2021 for International Patent Application No. PCT/EP2021/064778.

* cited by examiner

*Primary Examiner* — Matthew Katcoff
(74) *Attorney, Agent, or Firm* — Alix, Yale & Ristas, LLP

(57) ABSTRACT

The invention relates to a screw press for separating filtrate from a feed material. It is characterised in that a sensor arrangement comprising a sensor for measuring the filtrate content is arranged in the discharge area, the feed material flowing towards and/or around the sensor. This allows simple, prompt, and accurate measurement of the filtrate content.

13 Claims, 5 Drawing Sheets

METHOD AND DEVICE FOR MEASURING THE FILTRATE CONTENT ON A SCREW PRESS

BACKGROUND

The invention relates to a screw press for separating filtrate from a feed material, comprising a feed area, a dewatering area and a discharge area, where the feed material can be fed to the screw press via the feed area, the dewatering area comprising a pressing screw disposed in a filter drum so as to be rotatable around an axis of rotation, and where the feed material can be fed from the feed area through the dewatering area to the discharge area by rotation of the pressing screw, the feed material being guided in the dewatering area between the filter drum and the pressing screw and the filtrate being separable through the filter drum.

The invention also relates to a method for separating filtrate from a feed material, in which the feed material is fed to a screw press according to the invention via the feed area, the filtrate is separated from the feed material in the dewatering area between the pressing screw rotating around the axis of rotation and the filter drum, the feed material being compressed between the feed area and the discharge area, and the filtrate being discharged through the filter drum. The invention also relates to the use of a sensor for measuring the filtrate content of the feed material in a screw press.

Screw presses are typically used to separate filtrate from a feed material, e.g. in a fibre screw or a pulp screw. The feed material comprises a solid phase (the solid) and a liquid phase (the filtrate). The filtrate content then denotes the proportion of liquid phase (the filtrate) in the feed material. Dewatering separates filtrate from the feed material and thus reduces the filtrate content in the feed material. In this process, the feed material is fed to the screw press through the feed area. In the dewatering area, the feed material is dewatered, the dewatering area comprising a filter drum and a pressing screw rotating around an axis of rotation. The filter drum is typically perforated so that the filtrate pressed out of the feed material can be discharged or separated through the filter drum. The function of the pressing screw is, on the one hand, to transport the feed material from the feed area to the discharge area and, on the other hand, to increasingly compress the feed material and enable the separation of filtrate through the filter drum.

The feed material often has widely varying properties, such as a fluctuating filtrate content in the feed area, different dewaterability or compressibility, e.g. due to a different composition or a different structure of the solid phase. Here, it is important to be able to set a certain filtrate content with the screw press and also to be able to maintain it continuously during operation. Only then can subsequent processes be operated at an optimum. Often this is done by sampling the filtrate content at the discharge area of the screw press at discrete time intervals, which means manual sampling, evaluation, and analysis of the sample. This is time-consuming and only provides information on screw press operation at the time of sampling with some delay. The time discrepancy is problematic because, for example, in the meantime there is no optimally to the filtrate content and thus no effective chemical dosing possible, or the filtrate content in the discharge area can fluctuate and have a damaging effect on subsequent processes, e.g. combustion.

DE 202017105625 U1 describes a device for separating the components of a liquid containing solids, where the inner shell surface of the outlet nozzle formed as a pressing zone has at least one raised projection in the shape of a spur, which opposes the discharge movement of the solids. At least one spur can have a sensor or be a sensor itself and thus various values can be measured at the outlet nozzle of the device, for example the moisture content.

DE 102017115080 A1 describes a device and method for adjusting the dry substance content of solids cake with a sensor present in or on the outlet nozzle for determining the moisture content or pressure of the solids cake.

DE 20 2012 008 077 U1 describes a screw press separator with a sensor for detecting stresses that occur in at least one component of the screw press separator due to the solid material. This is to control the dry substance content of the solids exiting the screw press separator during operation.

DE 10 2017 115080 A1 discloses a method for adjusting the dry substance content of a solids cake and a device for separating the components of a liquid containing solids. Thus, it is disclosed that the power consumption of the drive is taken as a measure of the moisture content of the solids cake produced and/or the moisture content or pressure of the solids cake determined by means of at least one sensor is used as a measure for discharging the solids cake.

EP1873123A1 discloses a sludge thickener, where a tank is configured to accommodate the thickened sludge and the tank comprises a power sensor for determining the sludge concentration. The power sensor comprises a rotatable cylindrical body that is immersed in the thickened sludge, where the sludge concentration is inferred from the change in power consumption. However, the filtrate content is not measured directly, but estimated via a correlating variable—the pressure or the stresses induced by the pressure in mechanical components. Since many disturbance variables ultimately influence dewatering, the filtrate content determined in this way can only serve as a guide.

SUMMARY

The aim of the invention is a simple, prompt, and accurate measurement of the filtrate content.

According to the invention, this is achieved in that a sensor arrangement comprising a sensor for measuring the filtrate content is arranged in the discharge area, the feed material flowing towards and/or around the sensor. After compression of the feed material in the dewatering area, the feed material is fed to the discharge area, the pressure on the feed material being relieved in the discharge area, i.e. the pressure in the discharge area is reduced compared to the dewatering area. Surprisingly, it was found that disposing measuring instruments in the discharge area is more advantageous than disposing them in the dewatering area. Thus, incorrect filtrate contents are often determined with instruments disposed in the dewatering area. Disposing measuring instruments in the discharge area according to the invention leads, on the other hand, to reliable measurement results. The arrangement of the sensor in the discharge area according to the invention allows the filtrate content to be measured at a relatively constant pressure as the feed material is decompressed in the discharge area (e.g. to ambient pressure or to the pressure level of a subsequent process step). However, in the dewatering area different pressures emerge depending on operation of the screw press. According to the invention, a sensor is used for measuring the filtrate content. Advantageously, measurement of the filtrate content is based on measurement of the dielectric constant of the feed material. According to the invention, the feed material flows against and/or around the sensor. The flow of the feed material against and/or around the sensor has the effect that the feed material exerts a force on the sensor corresponding to the pressure of the feed material acting on the sensor. According to the invention, the filtrate content in the feed material can be measured continuously, i.e. in-line.

According to the invention, the screw press is characterised in that a pressure acting on the sensor from the feed material can be compensated via the sensor arrangement, where the sensor arrangement comprises a guide and the sensor can be moved by means of the guide in the discharge area to compensate for the pressure acting on the sensor from the feed material. Typically, the feed material to be dewatered is a non-Newtonian fluid. Surprisingly, it has now been found that the dielectric constant has a pressure dependence. In order to avoid misinterpretations of the dielectric constants and consequently of the filtrate content, the sensor is advantageously part of a sensor arrangement, where the pressure of the feed material acting on the sensor can be compensated by the sensor arrangement and a constant pressure acting on the sensor (set pressure) can be realised via the compensation. In this way, the pressure acting on the sensor can be kept constant, i.e. at the level of the set pressure, an influence of the dielectric constants by a deviating pressure can be avoided and the filtrate content can be measured accurately by measuring the dielectric constants. Surprisingly, the pressure acting on the sensor can be compensated by the fact that the sensor can be moved in the discharge area by means of the guide of the sensor arrangement. By moving the sensor in the discharge area, the sensor can avoid a pressure that deviates from the set pressure along the guide and position itself in the discharge area according to the set pressure.

In an advantageous embodiment, the guide of the sensor arrangement allows the sensor to be moved in a plane, the axis of rotation of the pressing screw forming the normal to this plane. In another advantageous embodiment, the distance between the sensor and the axis of rotation of the pressing screw, for example, can be changed by moving the sensor along the guide.

An equally favourable design of the screw press is characterised in that a compensation force can be applied to the sensor via the guide, the compensation force resisting the force resulting from the pressure acting on the sensor. Advantageously, a compensation force is applied to the sensor via the guide, where the compensation force is counter-directed to the force corresponding to the pressure of the feed material acting on the sensor. In force equilibrium, i.e. when the compensation force and the force from the pressure of the feed material are the same, there is no movement of the sensor. If there is a difference between the compensation force and the force from the pressure of the feed material, the sensor will be moved along the guide in the direction of the greater force.

An advantageous embodiment will apply a constant compensation force to the sensor. In this case, the sensor can be moved within a positioning range via the guide of the sensor arrangement, where the compensation force applied to the sensor is constant, at least in part of the positioning range.

A particularly favourable embodiment is characterised in that the sensor arrangement comprises a spring, where the spring acts pneumatic, hydraulically, electrically, or magnetically, and the compensation force can be applied to the sensor via the spring. Advantageously, a compensation force can be applied via a pneumatically, hydraulically, electrically, or magnetically acting spring. A pneumatic or hydraulic spring can be made using a pneumatically or hydraulically acting cylinder. According to the pneumatic or hydraulic pressure in the cylinder, a compensation force acts on the sensor.

It is particularly advantageous to apply the compensation force to the sensor via a magnetic spring, where the compensation force remains constant. Such magnetically acting springs allow a constant force effect over an area and thus a constant application of force to the sensor at least in part of the positioning range. Such magnetically acting springs are offered as constant force springs for industrial use. Magnetically acting springs have an advantage over pneumatically, hydraulically, or electrically acting springs in that auxiliary systems (e.g. pneumatics, hydraulics, . . . ) are not needed.

Another favourable embodiment of a screw press is characterised in that the sensor is movable along the guide against the force resulting from the pressure acting on the sensor in the case of a predominant compensation force, and in that the sensor is movable along the guide in the direction of the force resulting from the pressure in the case of a predominant force resulting from the pressure acting on the sensor. Surprisingly, because of the pressure acting on the sensor, the resulting force varies with the position of the sensor in the discharge area. Advantageously, the guide allows the sensor to be positioned, the distance between the sensor and the axis of rotation along the guide being variable. If, for example, the sensor is then moved along the guide by a larger resulting force against the smaller, constant compensation force, the distance between the sensor and the axis of rotation changes. According to the invention, as the distance between the sensor and the axis of rotation changes, the resulting force approaches the constant compensation force in terms of magnitude. Conversely, if for example the sensor is moved along the guide by the larger, constant compensation force against the smaller resulting force, the distance between the sensor and the axis of rotation also changes. With a change in the distance between the sensor and the axis of rotation, the resulting force again approaches the constant compensation force in terms of magnitude, according to the invention. This self-regulation leads to a positioning of the sensor, compensating for the pressure acting on the sensor.

The aim of the invention is also to provide a method for separating filtrate from a feed material with simple, timely and accurate measurement of the filtrate content.

According to the invention, this is achieved by measuring the filtrate content of the feed material in the discharge area, where feed material flows towards and/or around the sensor measuring the filtrate content. After compressing the feed material in the dewatering area, it is decompressed in the discharge area. Measuring the filtrate content in the discharge area and not in the dewatering area is surprisingly advantageous. According to the invention, the feed material flows against and/or around the sensor for measuring the filtrate content, the sensor for measuring the filtrate content being based on the measurement of the dielectric constant of the feed material.

According to the invention, the method is characterised in that the sensor arrangement allows compensation of the pressure acting on the sensor from the feed material, the sensor being moved by means of the guide of the sensor arrangement in the discharge area to compensate for the pressure acting on the sensor from the feed material. Surprisingly, it was noted that the pressure acting on the sensor varies with the positioning of the sensor in the discharge area. Thus, compensation of the pressure acting on the sensor is made possible by the sensor yielding to a pressure deviating from the set pressure along the guide and positioning itself in the discharge area according to the set pressure. Positioned in this way, a constant pressure acting on the sensor (set pressure) is realised, consequently avoiding any effect on the dielectric constants by pressure influences.

An equally favourable embodiment of the method is characterised in that a compensation force is applied to the sensor via the guide, the compensation force resisting the force resulting from the pressure acting on the sensor. If there is a difference between the compensation force and the force from the pressure of the feed material, the sensor will be moved along the guide in the direction of the greater force. With the movement of the sensor in the discharge area, the pressure acting on the sensor also changes, the sensor positioning itself in the discharge area according to the set pressure or according to the balance of the forces acting on the sensor from compensation force and force from the pressure of the feed material.

An advantageous embodiment of the method is characterised in that a constant compensation force is applied to the sensor.

An equally advantageous embodiment of the method is characterised in that the compensation force is applied to the sensor via the spring of the sensor arrangement, the spring acting pneumatically, hydraulically, electrically, or magnetically. Pneumatically, hydraulically, electrically, or magnetically acting springs advantageously allow a compensation force to be applied to the sensor over at least part of the positioning range.

An advantageous embodiment of the method is characterised in that a constant compensation force is applied to the sensor via the magnetic spring. Magnetic springs are particularly advantageous because they allow a constant compensation force to be applied to the sensor over at least part of the guide, independently of secondary systems (hydraulics, pneumatics, . . . ).

A favourable embodiment of the method is characterised in that the sensor is movable along the guide against the force resulting from the pressure acting on the sensor in the case of a predominant compensation force, and in that the sensor is movable along the guide in the direction of the force resulting from the pressure in the case of a predominant force resulting from the pressure acting on the sensor. Advantageously, the guide allows the sensor to be positioned, the distance between the sensor and the axis of rotation along the guide being variable. If, for example, the sensor is moved along the guide by a larger resulting force against the smaller, constant compensation force, then the resulting force approaches the constant compensation force in magnitude. Conversely, if, for example, the sensor is moved along the guide by the larger, constant compensation force against the smaller force resulting from the pressure, then the resulting force also approaches the constant compensation force in magnitude. This self-regulation leads to dynamic positioning of the sensor, compensating for the pressure acting on the sensor.

Equally advantageous is the use of a sensor for measuring the filtrate content of the feed material in a screw press according to the invention, the sensor being arranged in a sensor arrangement and the feed material flowing against and/or around the sensor. According to the invention, it is used with compensation of the pressure acting on the sensor, the sensor being moved via the guide of the sensor arrangement in the discharge area to compensate for the pressure acting on the sensor from the feed material.

BRIEF DESCRIPTION OF THE DRAWINGS

The invention will now be described using the examples in the drawings.

DETAILED DESCRIPTION

Figure 1:
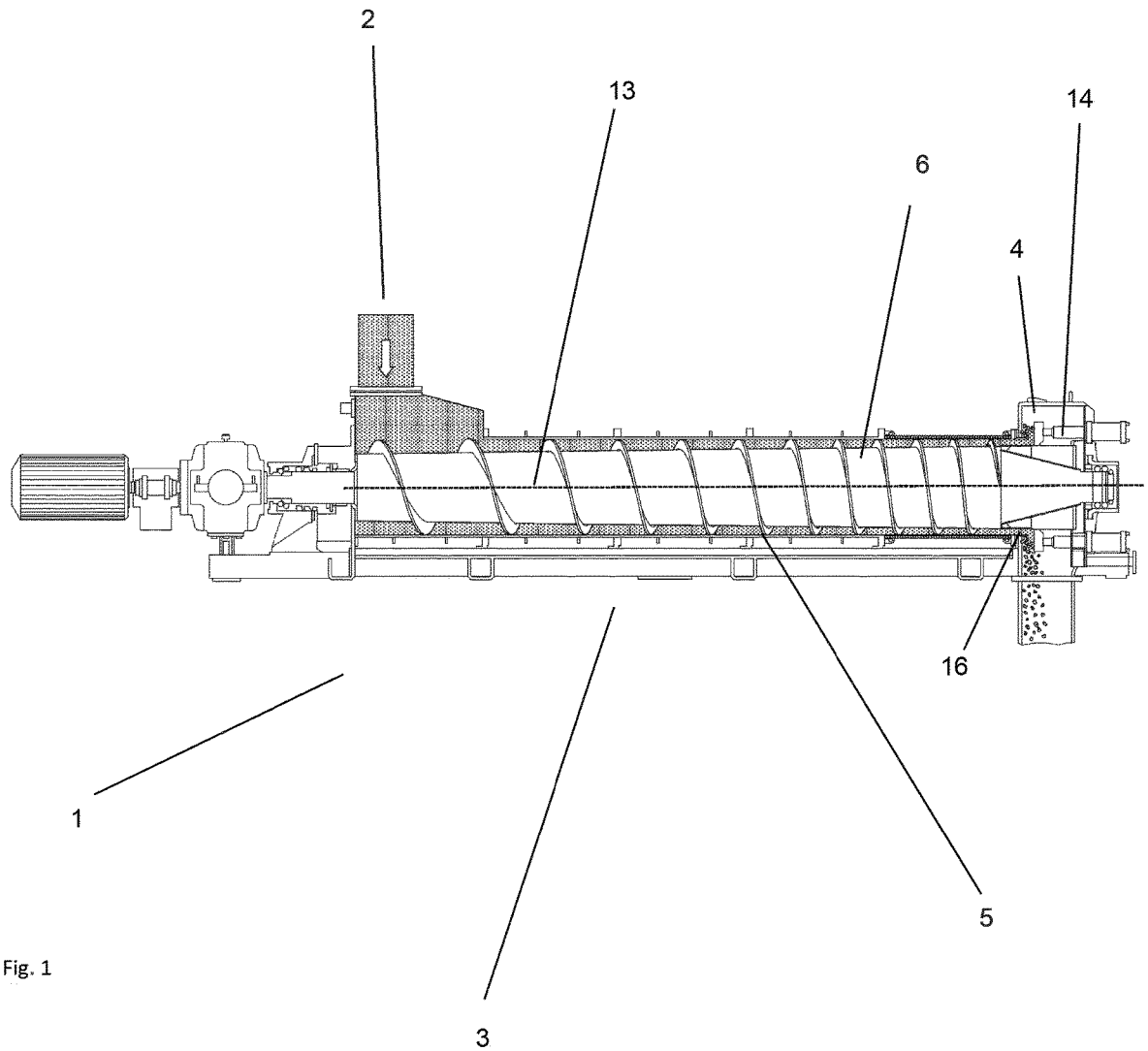
FIG. 1 shows a screw press according to the invention.

FIG. 1 shows a screw press according to the invention. The screw press 1 comprises a feed area 2, a dewatering area 3 and a discharge area 4. The dewatering area 3 comprises a pressing screw 6 disposed in a filter drum 5 arranged so as to be rotatable around an axis of rotation 13. The pressing screw 6 may, for example, comprise a flight disposed on a shaft. The space between the filter drum 5 and the pressing screw 6 narrows increasingly towards the discharge area 4. The feed material enters the screw press 1 through the feed area 2, the filtrate being separated from the feed material in the dewatering area 3 through the filter drum 5. For this purpose, the filter drum 5 has openings and is perforated, for example. Due to the rotation of the pressing screw 6 in the filter drum 5, the feed material is fed from the feed area 2 through the dewatering area 3 to the discharge area 4, the feed material being compressed increasingly in the dewatering area 3 in the direction of the discharge area 4. The feed material enters the discharge area 4 through the ring-shaped gap 16 formed between the filter drum 5 and the pressing screw 6, the pressing screw 6 conveying the feed material out of the dewatering area 3 against the counter-pressure unit 14. The counter-pressure unit 14 is, for example, circular, where, viewed in the direction of rotation 13, the circular ring of the counter-pressure unit 14 can at least be brought into alignment with the gap 16 between the filter drum 5 and the pressing screw 6. The feed material is deflected radially outwards at the counter-pressure unit 14, the feed material also having a speed component in circumferential direction corresponding to the rotation of the pressing screw 6. With the deflection of the feed material at the counter-pressure unit 14, the pressure on the feed material is relieved in the discharge area 4. Thus, the counter-pressure unit 14 enables the pressure on the feed material to build up in the dewatering area 3, and the pressure in the feed material is reduced when it is deflected at the counter-pressure unit 14. According to the invention, the sensor arrangement 9 comprising a sensor 7 is disposed in the discharge area 4 (not shown in FIG. 1), where the feed material can flow against and/or around the sensor 7.

Figure 2:
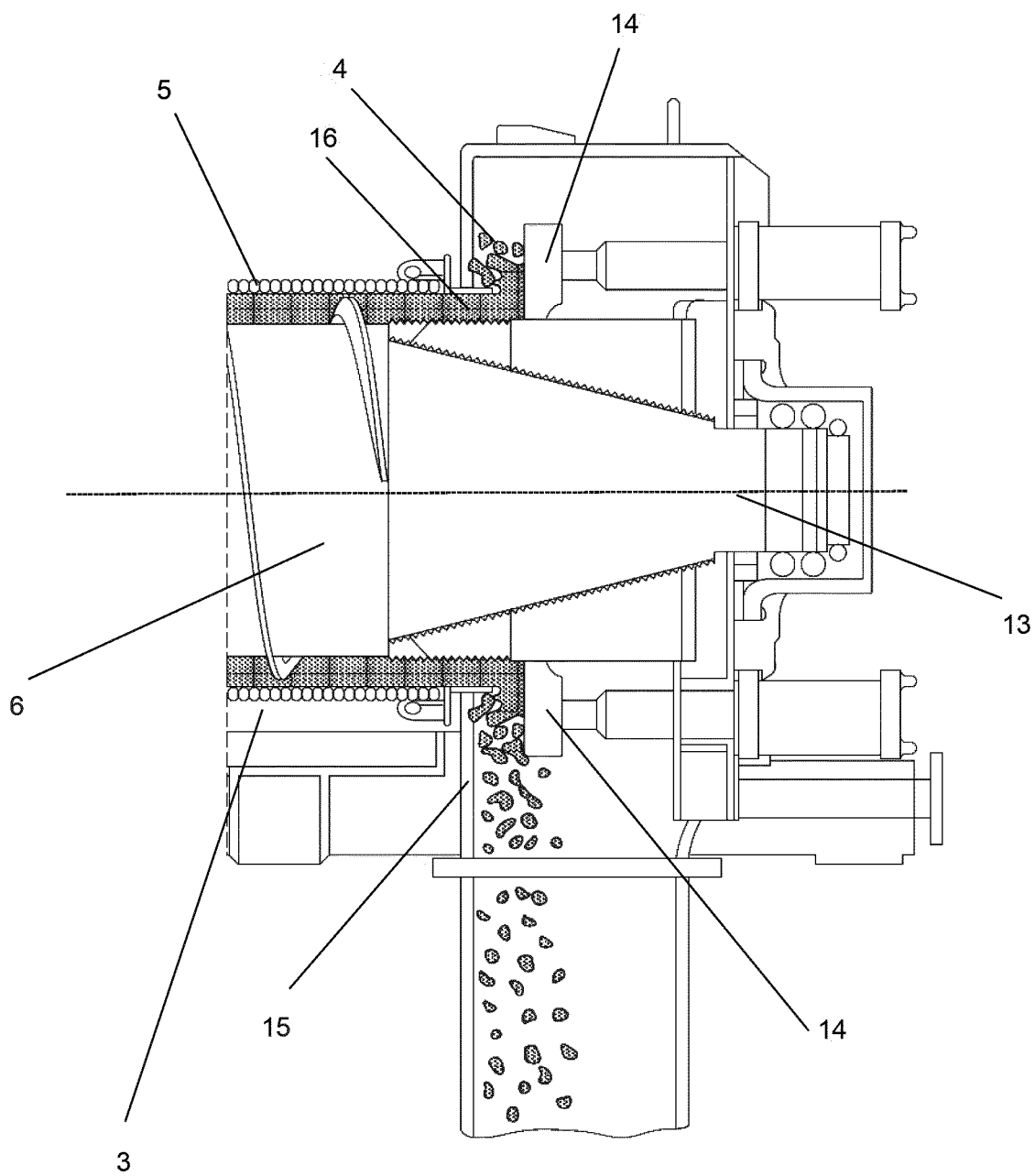
FIG. 2 shows the discharge area of a screw press according to the invention in a detailed view.

FIG. 2 shows the discharge area of a screw press in detail according to the invention. In the dewatering area 3, the feed material is compressed in the direction of the discharge area 4, the feed material being guided in the gap area between the filter drum 5 and the pressing screw 6 and the pressing screw 6 conveying the feed material out of the dewatering area 3 through the gap 16 against the counter-pressure unit 14. In this case, the pressing screw 6 comprises, for example, a shaft and a spiral-shaped flight. The feed material enters the discharge area 4 through the gap 16 formed between the filter drum 5 and the pressing screw 6. The feed material is deflected radially outwards between the wall 15 of the discharge area 4 and the counter-pressure unit 14, the feed material also having a circumferential speed component corresponding to the rotation of the pressing screw 6. The pressure on the feed material is relieved in the discharge area 4 when the feed material is deflected at the counter-pressure unit 14.

Figure 3:
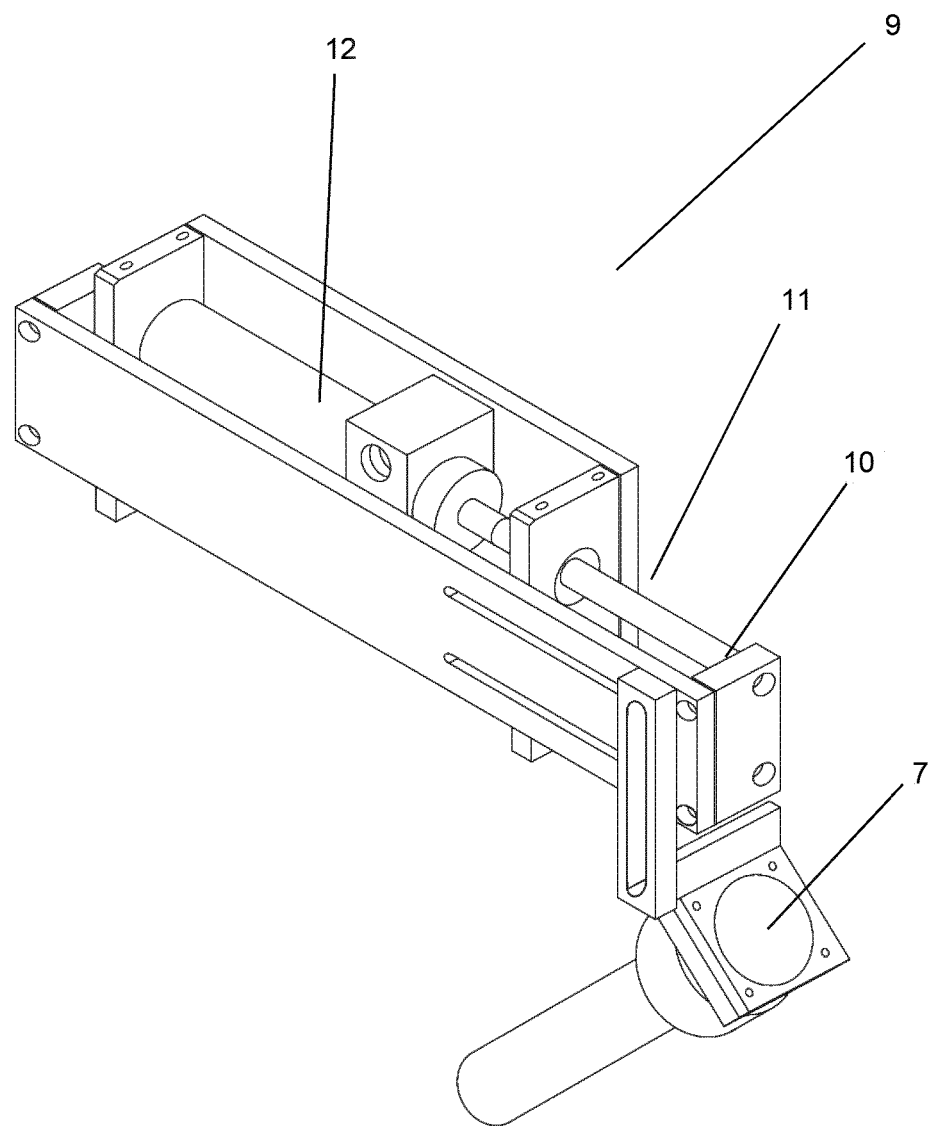
FIG. 3 shows an advantageous sensor arrangement.

FIG. 3 shows an advantageous sensor arrangement. According to the invention, the sensor arrangement 9 comprises a sensor 7 for measuring the filtrate content in the feed material. Advantageously, measurement of the filtrate content is based on measurement of the dielectric constant of the feed material. Advantageously, the sensor arrangement 9 further comprises a guide 10 and a spring 12. Here, the sensor 7 is connected to the spring 12 via the guide 10, where the sensor 7 can be moved by means of the guide 10. The pressure exerted by the feed material on the sensor 7, or the resulting force, is transferred via the guide 10 to the spring 12, the spring 12 transferring a compensation force to the guide 10. The compensation force of the spring 12 and the force resulting from the feed material on the guide 10 are oriented in opposite directions according to the principle of counteraction (action=reaction). Accordingly, if the compensation force is predominant, the sensor 7 is moved along the guide 10 against the force resulting from the pressure acting on the sensor 7, or in the case of a predominant force resulting from the pressure acting on the sensor 7, the sensor 7 is moved along the guide 10 in the direction of the resulting force. As long as the balance of forces between the resulting force and the compensation force is given, there is no further movement of the sensor. In this way, the sensor arrangement 9 allows compensation of the resulting force acting on the sensor 7 from the feed material. Advantageously, the spring 12 allows a constant compensation force to be applied to the sensor 7. Since the sensor 7 can be moved via the guide in a positioning range 11, the constant compensation force can be applied to the sensor 7 via the spring 12, at least in part of the positioning range 11. Advantageously, the spring 12 acts pneumatically, hydraulically, electrically, or magnetically. Such a magnetically acting spring 12 allows a constant force effect over an area and thus a constant force application to the sensor 7, at least in part of the positioning range 11. Such magnetically acting springs 12 are offered, for example, as constant force springs for industrial use and have the advantage over pneumatically, hydraulically, or electrically acting springs in that auxiliary systems (e.g. pneumatics, hydraulics, . . . ) are not needed.

Figure 4:
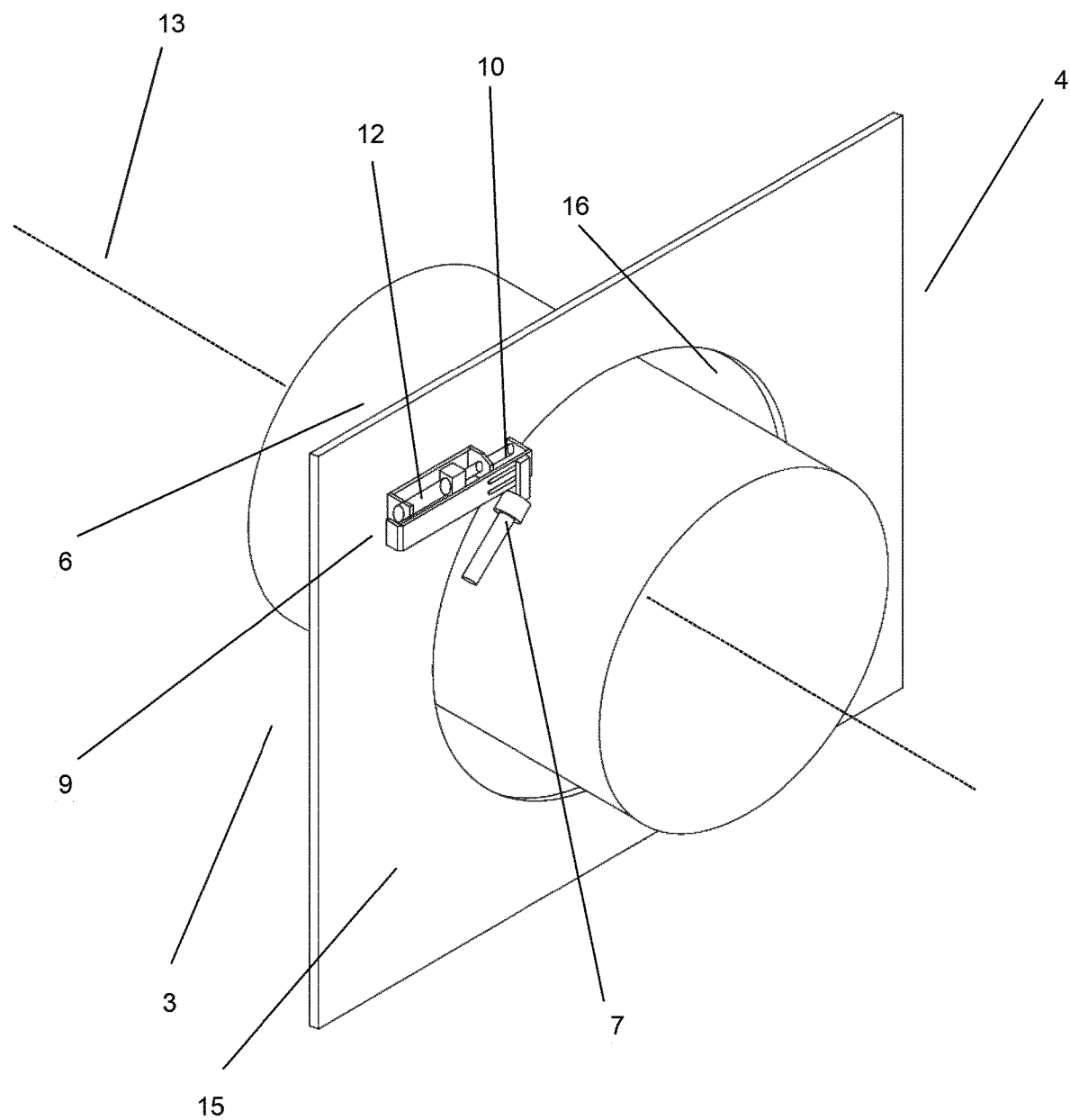
FIG. 4 shows an advantageous sensor arrangement at the discharge area of the screw press.

FIG. 4 shows an advantageous sensor arrangement at the discharge area of the screw press. Here, the pressing screw 6 arranged rotatably around the axis of rotation 13 is indicated schematically, the pressing screw 6 extending from the dewatering area 3 into the discharge area 4. The material to be conveyed is fed to the discharge area 4 via the gap 16 between the filter drum 5 (not shown) and the pressing screw 6 or via the gap 16 between the wall 15 of the discharge area 4 and the pressing screw 6. The sensor arrangement 9 can be secured to the wall 15 of the discharge area. The sensor arrangement 9 comprises the sensor 7, the guide 10 and the spring 12, the guide 10 enabling the sensor 7 to be moved in a positioning range 11. The feed material can flow against and/or around the sensor 7. In the process, the feed material is guided from the dewatering area 3 into the discharge area 4 and deflected radially outwards between the wall 15 of the discharge area 4 and the counter-pressure unit 14, the feed material also having a circumferential speed component corresponding to the rotation of the pressing screw 6. Advantageously, the sensor 7 is positioned between the wall 15 of the discharge area 4 and the counter-pressure unit 14 when viewed in axial direction, i.e. in the direction of the axis of rotation 13, the feed material flowing against and/or around the sensor 7 after being deflected at the counter-pressure unit. When the sensor 7 is moved within the positioning range 11 of the guide 10 in the discharge area 4, it is possible advantageously to position the sensor 7 inside and/or outside the gap 16 between the wall 15 of the discharge area 4 and the pressing screw 6, where the sensor 7 can be easily approached and/or bypassed by the feed material.

Figure 5:
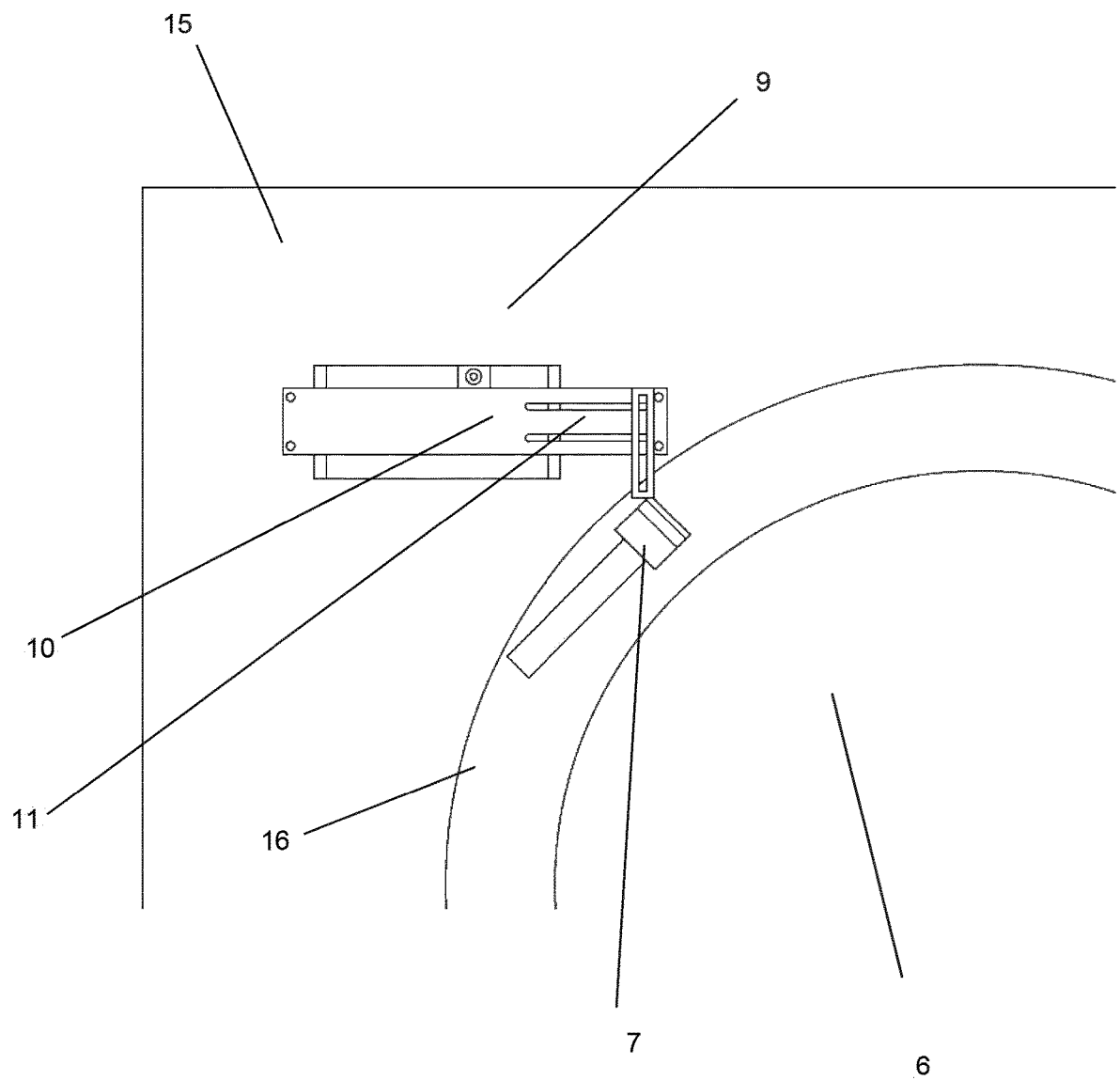
FIG. 5 shows an advantageous sensor arrangement at the discharge area of the screw press, viewed in the direction of the axis of rotation.

FIG. 5 shows an advantageous sensor arrangement at the discharge area of the screw press, viewed in the direction of the axis of rotation. Here, the pressing screw 6 is indicated schematically, the pressing screw 6 extending into the discharge area 4. The material to be conveyed is fed to the discharge area 4 via the gap 16 between the filter drum 5 (not shown) and the pressing screw 6 or via the gap 16 between the wall 15 of the discharge area 4 and the pressing screw 6. The sensor arrangement 9 is secured to the wall 15 of the discharge area 4 and comprises the sensor 7, the guide 10 and the spring 12, the guide 10 enabling the sensor 7 to be moved in a positioning range 11. The feed material flows towards and/or around the sensor 7. When the sensor 7 is moved within the positioning range 11 of the guide 10 in the discharge area 4, it is possible advantageously to position the sensor 7 inside and/or outside the gap 16 between the wall 15 of the discharge area 4 and the pressing screw 6, where the sensor 7 can be easily approached and/or bypassed by the feed material.

The present invention offers numerous advantages. It allows simple, timely and accurate measurement of the filtrate content of a feed material processed with a screw press. By precisely determining the filtrate content, operation of the screw press can be adjusted to achieve a certain filtrate content, and the usual influencing parameters (pressing screw speed, pressure of the counter-pressure unit, . . . ) can be automatically controlled to set the desired filtrate content. A precisely adjusted filtrate content after the screw press is advantageous for subsequent processes because an optimum operating point can be set.

REFERENCE NUMERALS (1) Screw press
(2) Feed area
(3) Dewatering area
(4) Discharge area
(5) Filter drum
(6) Pressing screw
(7) Sensor
(8) Axial direction
(9) Sensor arrangement
(10) Guide
(11) Positioning range
(12) Spring
(13) Axis of rotation
(14) Counter-pressure unit
(15) Wall
(16) Gap

The invention claimed is:

1. A screw press (1) for separating filtrate from a feed material, comprising a feed area (2), a dewatering area (3) and a discharge area (4), where the feed material can be fed to the screw press (1) via the feed area (2), the dewatering area (3) comprises a pressing screw (6) arranged in a filter drum (5) so as to be rotatable around an axis of rotation (13) and, by rotation of the pressing screw (6), the feed material can be fed from the feed area (2) via the dewatering area (3) to the discharge area (4), where the feed material is guided in the dewatering area (3) between the filter drum (5) and the pressing screw (6), the filtrate can be separated through the filter drum (5), and a sensor arrangement (9) comprising a sensor (7) for measuring the filtrate content is arranged in the discharge area (4), where the feed material can flow against or around the sensor (7), wherein a pressure acting on the sensor (7) from the feed material can be compensated via the sensor arrangement (9), where the sensor arrangement (9) comprises a guide (10) and the sensor (7) can be moved by means of the guide (10) in the discharge area (4) to compensate for the pressure acting on the sensor (7) from the feed material.

2. The screw press (1) of claim 1, wherein a compensation force can be applied to the sensor (7) via the guide (10), the compensation force resisting the force resulting from the pressure acting on the sensor (7).

3. The screw press (1) of claim 2, wherein a constant compensation force can be applied to the sensor (7).

4. The screw press (1) of claim 2, wherein the sensor arrangement (9) comprises a spring (12), where the spring (12) acts pneumatically, hydraulically, electrically, or magnetically, and the compensation force can be applied to the sensor (7) via the spring (12).

5. The screw press (1) of claim 2, wherein the compensation force can be applied to the sensor (7) via a magnetic spring (12), the compensation force being constant.

6. The screw press (1) of claim 2, wherein the sensor (7) is movable along the guide (10) against the force resulting from the pressure acting on the sensor (7) in the case of a predominant compensation force, and in that the sensor (7) is movable along the guide (10) in the direction of the force resulting from the pressure in the case of a predominant force resulting from the pressure acting on the sensor (7).

7. A method for separating filtrate from a feed material, in which the feed material is fed to a screw press (1) of claim 1 via the feed area (2), the filtrate is separated from the feed material in the dewatering area (3) between the pressing screw (6) rotating around the axis of rotation (13) and the filter drum (5), the feed material being compressed between the feed area (2) and the discharge area (4) and the filtrate being discharged through the filter drum (5), and the filtrate content of the feed material is measured in the discharge area (4), the feed material flowing against or flowing around the sensor (7) for measuring the filtrate content, wherein the sensor arrangement (9) allows compensation of the pressure acting on the sensor (7) from the feed material, the sensor (7) being moved by means of the guide (10) of the sensor arrangement (9) in the discharge area (4) to compensate for the pressure acting on the sensor (7) from the feed material.

8. The method of claim 7, wherein a compensation force can be applied to the sensor (7) via the guide (10), the compensation force resisting the force resulting from the pressure acting on the sensor (7).

9. The method of claim 8, wherein a constant compensation force can be applied to the sensor (7).

10. The method of claim 8, wherein the compensation force is applied to the sensor (7) via the spring (12) of the sensor arrangement (9), the spring (12) acting pneumatically, hydraulically, electrically, or magnetically.

11. The method of claim 8, wherein a constant compensation force is applied to the sensor (7) via a magnetic spring (12).

12. The method of claim 8, wherein the sensor (7) is movable along the guide (10) against the force resulting from the pressure acting on the sensor (7) in the case of a predominant compensation force and in that the sensor (7) is movable along the guide (10) in the direction of the force resulting from the pressure in the case of a predominant force resulting from the pressure acting on the sensor (7).

13. Use of a sensor (7) for measuring the filtrate content of the feed material in a screw press (1) of claim 1, where the sensor (7) is arranged in a sensor arrangement (9) and the feed material flows against or around the sensor (7).

\* \* \* \* \*